United States Patent
Kaczmarek et al.

(10) Patent No.: US 6,805,083 B2
(45) Date of Patent: Oct. 19, 2004

(54) CAM COVER GASKET

(75) Inventors: Brian Kaczmarek, Clawson, MI (US); Deborah M. Bjorge, Royal Oak, MI (US); Keith David Gosdzinski, Livonia, MI (US); Kim Ku, West Bloomfield, MI (US); Mark Alan Zagata, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 10/065,368

(22) Filed: Oct. 10, 2002

(65) Prior Publication Data

US 2004/0069258 A1 Apr. 15, 2004

(51) Int. Cl.[7] .................................................. F01M 9/10
(52) U.S. Cl. ........................ 123/90.38; 123/195 C; 123/198 E; 123/90.39
(58) Field of Search ................ 123/90.38, 195 C, 123/198 E, 193.5, 193.3; 277/591, 651, 652; 439/130

(56) References Cited

U.S. PATENT DOCUMENTS

| | | | |
|---|---|---|---|
| 4,615,306 A | 10/1986 | Wakeman | 123/90.16 |
| 5,003,933 A | 4/1991 | Rush, II et al. | 123/52 |
| 5,035,637 A | 7/1991 | Mathews et al. | 439/271 |
| 5,189,782 A | 3/1993 | Hickey | 29/602.1 |
| 5,449,227 A | 9/1995 | Steinberg et al. | 303/119.2 |
| 5,515,905 A | 5/1996 | Lester | 164/313 |
| 5,524,580 A | 6/1996 | Muir | 123/90.16 |
| 5,544,626 A | 8/1996 | Diggs et al. | 123/90.16 |
| 5,623,897 A | 4/1997 | Hampton et al. | 123/90.16 |
| 5,690,066 A | 11/1997 | Hampton et al. | 123/90.16 |
| 6,186,106 B1 | 2/2001 | Glovatsky et al. | 123/143 |
| 6,250,335 B1 | 6/2001 | Ohishi et al. | 137/884 |
| 6,318,318 B1 | 11/2001 | Jahr | 123/90.16 |
| 6,439,176 B1 * | 8/2002 | Payne et al. | 123/90.12 |
| 6,499,451 B1 * | 12/2002 | Hendriksma et al. | 123/90.16 |
| 6,609,487 B1 * | 8/2003 | Morris | 123/90.38 |
| 6,615,796 B2 * | 9/2003 | Iizuka et al. | 123/310 |

* cited by examiner

Primary Examiner—Thomas Denion
Assistant Examiner—Ching Chang
(74) Attorney, Agent, or Firm—Gary Smith

(57) ABSTRACT

A cam cover gasket 207 is provided which includes a generally compliant first material 210 having an upper surface for contact with a cover 200 and a lower surface for contact with an engine head 2, a generally rigid bracket frame of a second material 222 connected with the first material 210, and a solenoid actuator 232 connected with the second material 222.

30 Claims, 5 Drawing Sheets

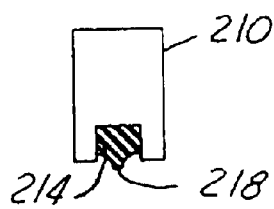
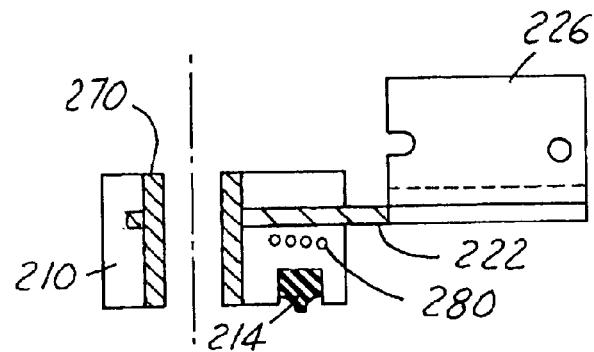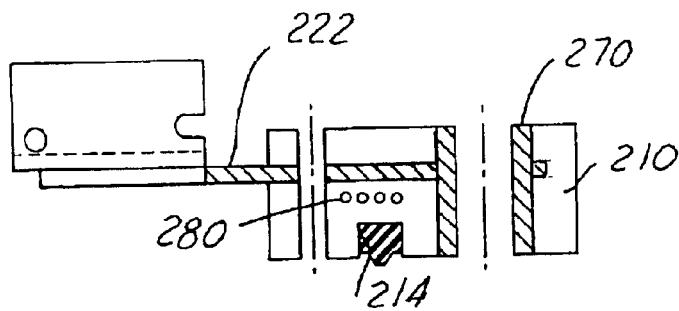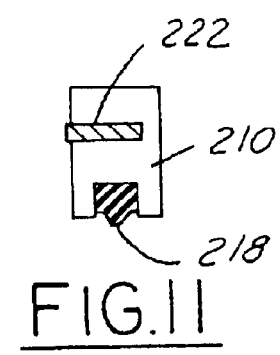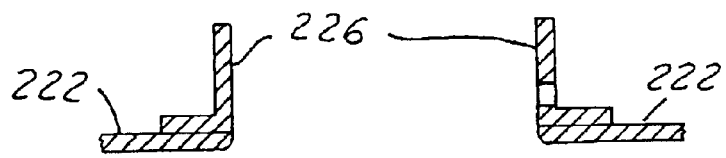

CAM COVER GASKET

BACKGROUND OF INVENTION

The field of the present invention is an internal combustion engine having dual operational mode rocker arm assemblies.

Most reciprocating piston internal combustion engines have rocker arms to transmit motion from a rotating cam shaft to a stem of a combustion chamber intake or exhaust poppet valve to open and close the same. Almost universally, the valve is spring-biased shut and the cam, via the rocker arm controls the opening and closing of the valve. One type of rocker arm is the finger follower rocker arm.

In recent times, rocker arm assemblies have been made to selectively deactivate. In one such rocker arm assembly, the rocker arm has an outer body that engages the valve stem and an inner, lost motion arm pivotally mounted on and within the outer body for movement relative to the outer body. The lost motion arm is spring-biased upward against an overhead engine cam center lobe to be pivoted by the same. A latch mechanism with an extendable plunger is positioned within the outer body. The plunger is normally in a position to limit movement of the lost motion arm relative to the outer body so that the cam lobe can pivot the outer body and lost motion arm together as an integral unit to activate the valve stem. Withdrawal of the latch mechanism plunger allows the lost motion arm to freewheel in a lost motion manner without causing partial or full movement of the outer body and valve stem.

To selectively activate the plunger of the rocker arm assembly there is provided a pivotal lever. Typically, reciprocating piston automotive vehicles will have at least one exhaust valve. Most newer engines have one or more intake valves. Accordingly, for each given cylinder, a solenoid will control one or more rocker arm assemblies.

The solenoid actuator must be accurately positioned with respect to the latch mechanism to insure proper plunger operation. Typically, the solenoid actuator was connected with a bracket which in turn was connected with the engine head. Any misalignment between the bracket and the engine head could contribute to a misalignment of the solenoid actuator to the latch mechanism plunger. Therefore, a method to accurately position the solenoid actuator with respect to the plunger which is not susceptible to misalignment of the bracket with respect to the engine head is highly desired.

It is also desired that the solenoid actuator be as small as possible. Typically, the actuator voltage supply wiring harness is exposed to the interior of the engine head, which is a very hostile environment due to the exposure to hot engine oil. Assembly of the wiring harness also consumes a relatively large amount of time.

It is also desirable to provide an apparatus and method of utilization thereof of placement of the solenoids associated with dual operational mode rocker arms which allows placement of all the solenoid actuators in a single manufacturing step.

SUMMARY OF INVENTION

The present invention provides an internal combustion engine with a cylinder head that includes intake and exhaust passageways which are fluidly connected with respective combustion chambers. A poppet valve is provided for controlling fluid communication between the combustion chamber and the intake or exhaust passageway.

A cover is provided for enclosing the rocker arm assemblies. The cover, often referred to as a cam cover, has a surface for mating with the cylinder head. A gasket is provided which is captured between the mating surface of the cam cover and the cylinder head. The gasket has a generally soft polymeric material which is similar or identical to that currently being utilized for sealing the cam cover to the engine head.

Encapsulated within the generally soft polymeric material is a generally rigid (metallic) bracket frame. The bracket frame provides a highly accurate mounting platform for the solenoids that activates the various rocker arm assemblies of the engine bank. To power the various solenoids, a wiring harness is encapsulated within the gasket.

It is an advantage of the present invention to provide a cam cover gasket which allows highly accurate dimensional placement of the solenoid actuators associated with dual mode operational rocker arm assemblies.

It is a further advantage of the present invention to provide an engine as noted above wherein the wiring harness associated with the solenoids utilized for the dual mode rocker arm assemblies is installed upon installation of the gasket.

Other features and advantages of various embodiments of the present invention will become more apparent to those skilled in the art from a reading of the following detailed description and upon reference to the drawings.

BRIEF DESCRIPTION OF DRAWINGS

FIGS. 6–12 are sectional views taken along corresponding sectional lines of FIG. 5.

DETAILED DESCRIPTION

Figure 1:
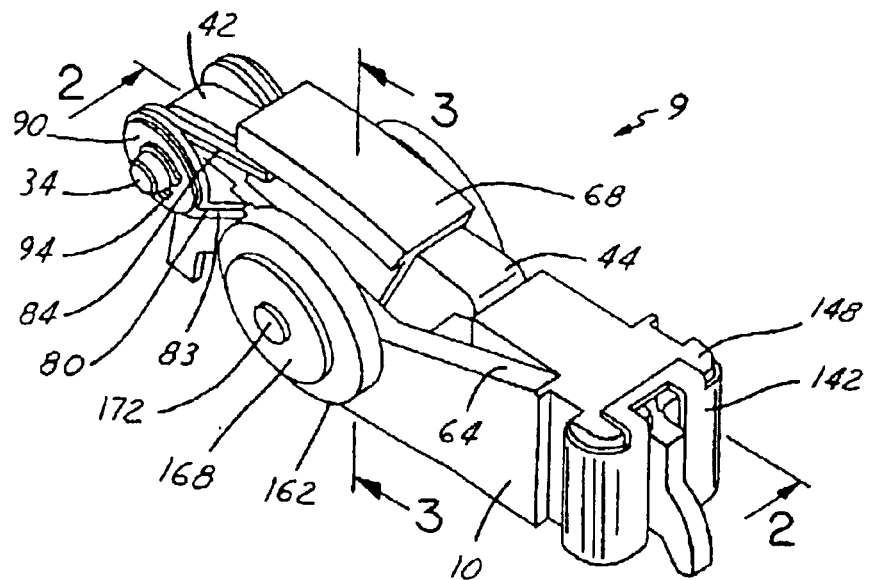
FIG. 1 is a perspective view of a switchable rocker arm assembly utilized with the inventive cam cover gasket of the present invention.
Figure 2:
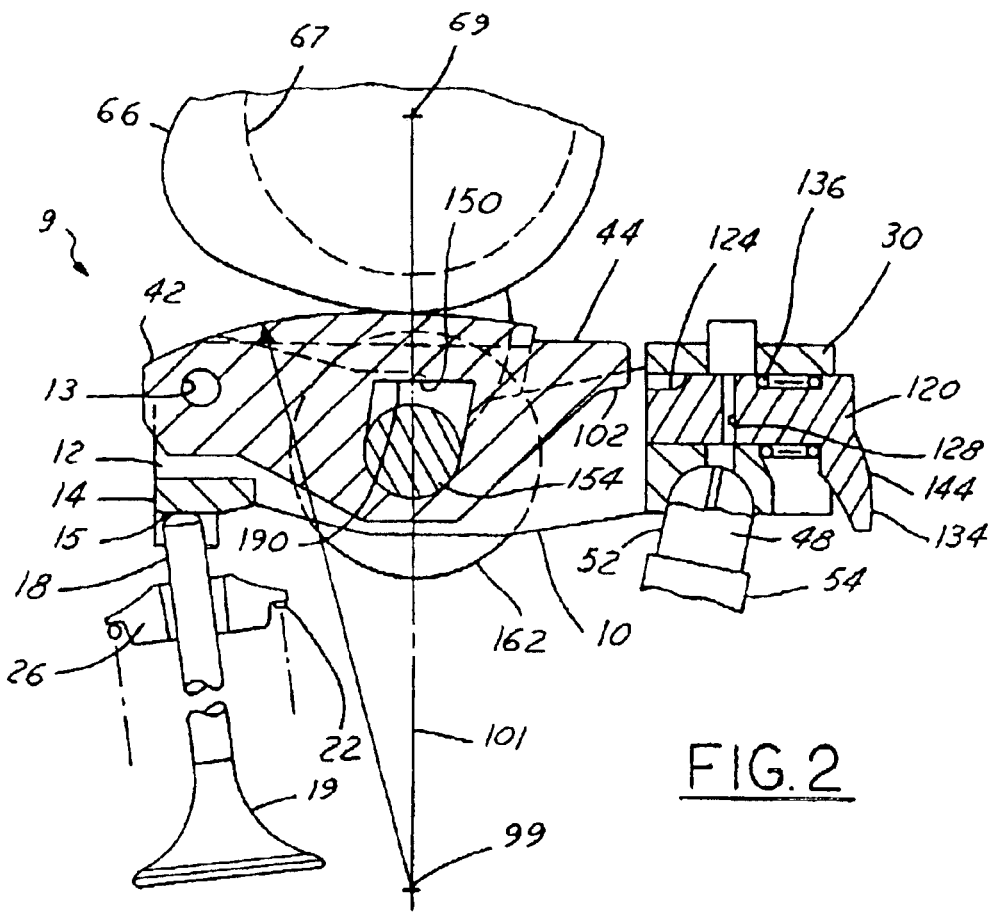
FIG. 2 is a sectional view taken along lines 2—2 of FIG. 1.

FIGS. 1 through 4 illustrate an internal combustion engine 7 according to the present invention. The engine has a head 2. The engine 7 has intake and exhaust rocker arm assemblies 8 and 9. The rocker arm assembly 9 has a forked shaped body 10 which is often referred to as a cradle or outer arm. The body has twin ears 12 (FIG. 2). The ears 12 have a transverse bore 13. The body 10 has a first end 14. The body first end 14 as best shown in FIG. 2 engages with a valve stem 18 via a convex contact surface 15 (only partially shown) to activate a poppet valve 19. The valve stem 18 is biased generally upward by a spring 22 which is captured by a valve stem collar 26. The upward biasing of the valve stem 18 places the valve 19 in a closed position to prevent fluid communication through a port to a combustion chamber 31 of the engine. To open the poppet valve, the body first end 14 will pivot in a generally counter-clockwise direction.

The body 10 has an opposite second end 30. The second end 30 engages with a pivot fulcrum 48. The pivot fulcrum 48 is provided by a plunger portion 52 of a hydraulic lash adjuster 54. The body second end 30 has a spherical socket receiving the plunger 52. The lash adjuster 54 constitutes a stationary fulcrum for pivotal movement of the body 10 of the rocker arm assembly in a manner to be described.

An inner or lost motion arm 44 is pivotally connected to the first end 14 of the body 10. A pin 34 passes through bore 13 and a corresponding bore in the lost motion arm 44. A lever end 42 of the lost motion arm is pivotally connected by the pin 34. The lost motion arm 44 fits in between fork like lobes 64 of the body. The lost motion arm 44 is spring biased arcuately in a counter-clockwise direction as shown in FIG. 1 to have contact with a rotatable cam lobe 66. The cam lobe 66 is rotated by a camshaft 67 that is powered by the engine. To make contact with the cam lobe 66, the lost motion arm 44 has a contact pad 68.

Figure 3:
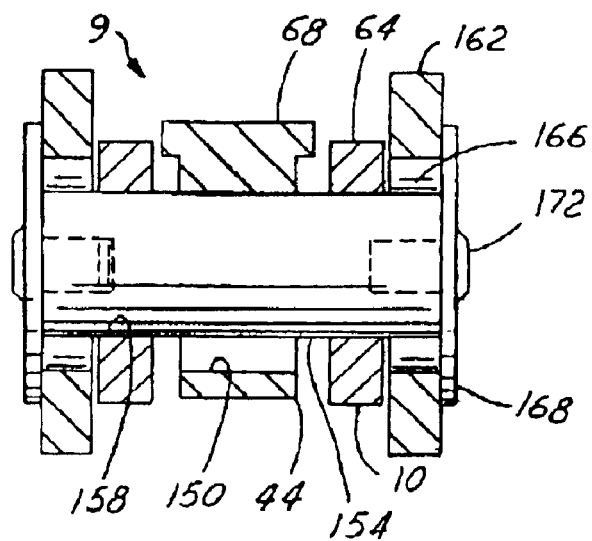
FIG. 3 is a sectional view taken along lines 3—3 of FIG. 1.
Figure 4:
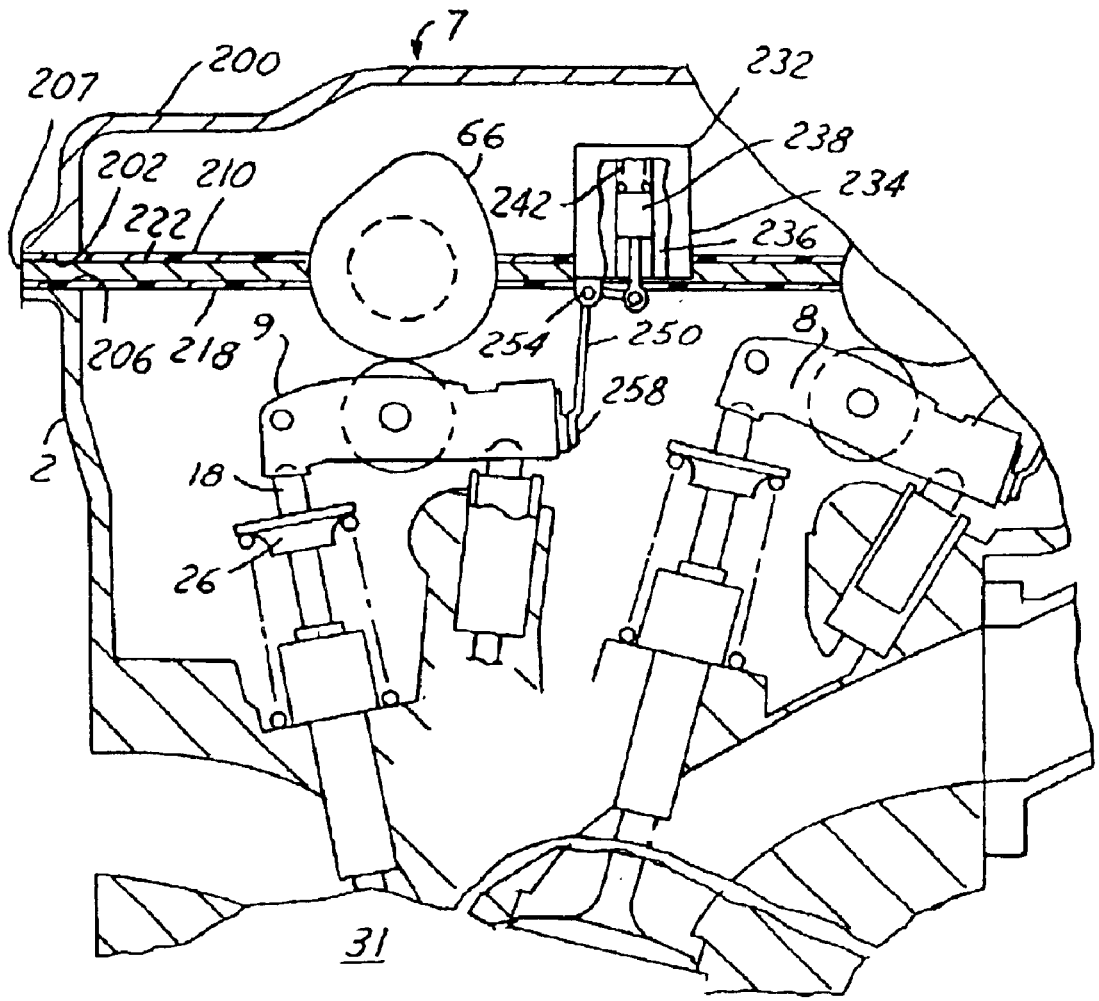
FIG. 4 is a partial side elevational view of a preferred embodiment engine utilizing the cam cover gasket according to the present invention.
Figure 5:
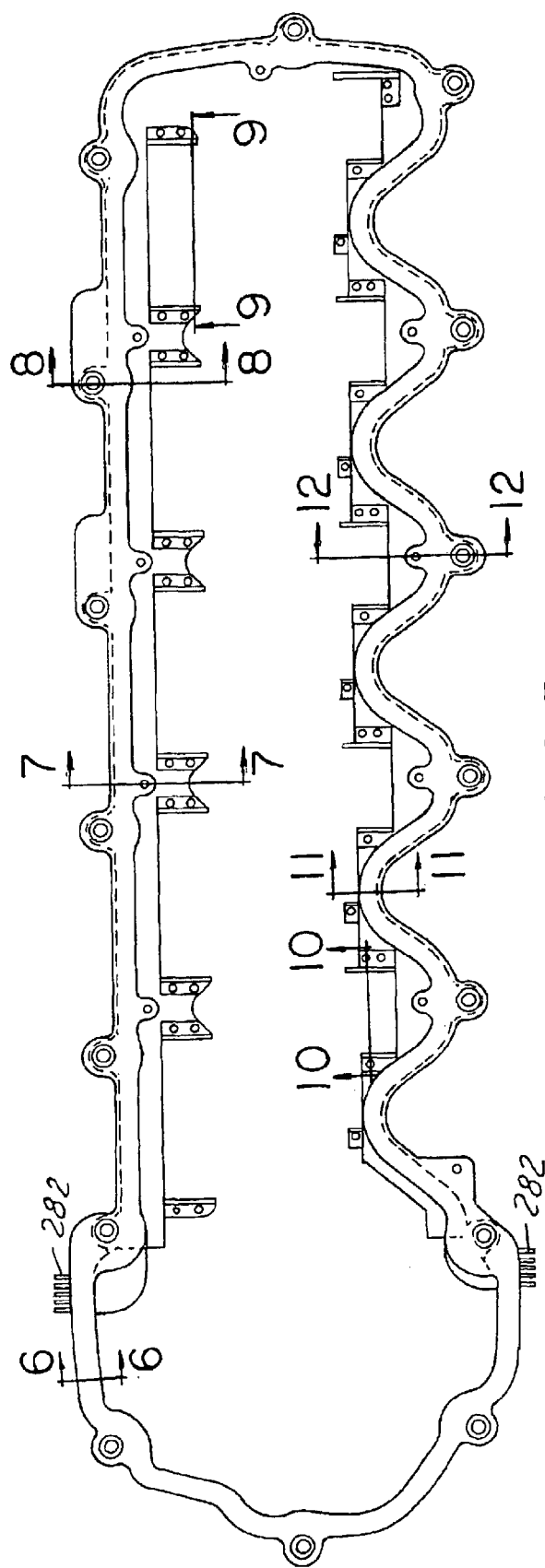
FIG. 5 is a top plan view of the cam cover gasket utilized in the engine of FIG. 4.
Figure 9:
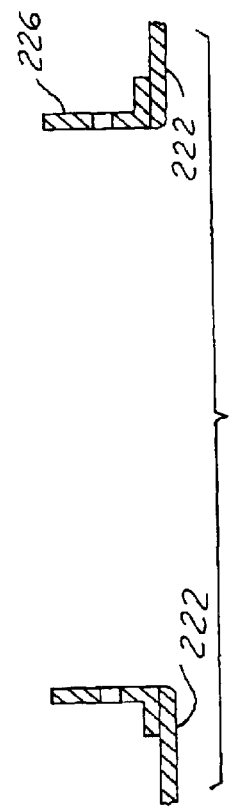
Figure 7:
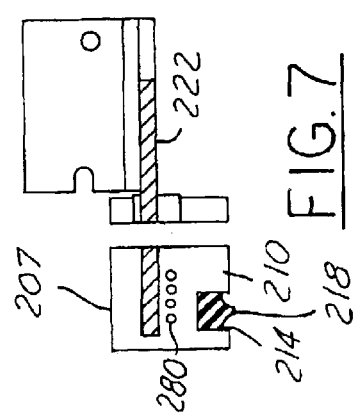
Figure 13:
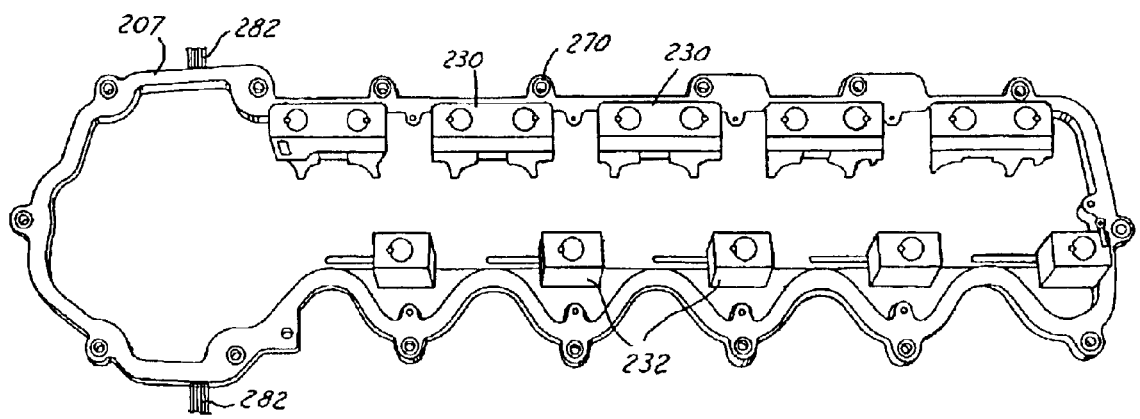
FIG. 13 is a perspective view of the cam cover gasket with the solenoids attached thereto as the unit is ready for assembly to the head of the vehicle engine.

The lost motion arm 44 has an aperture 150 transversely extending therethrough (FIG. 3). Extending through the aperture is a shaft 154. The shaft 154 is press-fitted through aligned apertures 158 provided in the lobes 64 of the body. Mounted on the shaft 154 are rollers 162 that rotatably connect with the body 10. The rollers 162 are mounted on the shaft 154 by needle bearings 166. The needle bearings 166 are held in position by a cover 168. The cover 168 is connected with the shaft 154 by a pin 172.

The lost motion arm 44 is spring biased into the cam lobe 66 by coil torsion springs 80. The coil torsion springs 80 have a first leg 83 which pushes against the body 10. The springs 80 have a second leg 84 which interacts with the lost motion arm 44 to urge it in a counter-clockwise direction. The springs 80 encircle the pin 34 and are mounted on the dual heads 90 of the pin. The heads 90 are held in position on the pin 34 by a retention washer 94.

The second end 30 of the body 10 also has a latch mechanism. The latch mechanism includes an extendable plunger 120. The plunger 120 has an upper first contact surface 124. The plunger 120 also has a transverse bore 128 to allow for the cumulative flow of lubricating oil therethrough. The plunger 120, as shown in FIG. 2, has an extended (leftward) first position wherein its first contact surface 124 makes contact with a first contact surface 102 of the lost motion arm. In the first position, the plunger 120 prevents relative angular motion of the lost motion arm 44 with respect to the body 10 in a clockwise direction. The plunger 120, as best shown in FIG. 2, has a second position which is non-contacting with the lost motion arm 44 to allow the lost motion arm 44 to pivot clockwise relative to the body 10.

The plunger 120 has fixably connected thereto a latch pin 134. A spring 136 encircles the plunger 120 in its position within a bore of the body 10. The spring 136 urges the latch pin 134 to the right, as shown in FIG. 2, to position the plunger 120 in its aforementioned second position. The plunger 120 is held to the body 10 by a latch pin retainer 142 that clips onto a transverse ledge 148 of the body 10 (FIG. 1).

Turning now to FIGS. 4–13, the engine 7 has a cam cover 200. The cam cover 200 encloses the rocker arms assemblies 8 and 9. The cam cover has a bottom surface 202 for mating with a top surface 206 of the head 2. Captured between the cam cover 200 and the head 2 is a gasket 207. The gasket is fabricated on a first soft polymeric material 210. Typically, such material may be glass field nylon. The gasket soft material 210 has in its bottom end a rectangular shape pocket 214. The pocket 214 has inserted therein a second polymeric material 218. The second polymeric material can be a rubber such as Plumley 10-1316-2.

Encapsulated within the soft material 210. is a generally rigid material. The generally rigid material forms a bracket frame The gasket soft material 210 has a generally C-shape cross-section. The bracket frame 222 has an end captured within the C-shape cross-section. The bracket frame 222 will typically be fabricated from steel 2.0 mm in thickness. The bracket frame has fixedly connected thereto L-shape bracket supports 226, provided to allow for the attachment of intake solenoids 230 or exhaust solenoids 232. The exhaust solenoid 232 has a housing 234. The housing 234 encircles a solenoid cell 236 which in turn encircles a solenoid plunger 238. The plunger 238 is spring biased in a lower position by a solenoid spring 242. The solenoid plunger 238 is pivotally connected to an L-shape lever arm 250. The L-shape lever arm 250 is pivotally connected with the solenoid casing at pivot point 254.

The lever arm 250 has a hammer head 258. The hammer head 258 engages or disengages the latch pin 134 of the rocker arm assembly. The hammer head makes contact with a cylindrical surface 144 of the latch pin. The hammer head is edged into engagement with the latch pin by the aforementioned solenoid actuator spring 242 thereby compressing the plunger spring 136.

When it is desirable for the rocker arm latch plunger 120 to assume its second position, as shown in FIG. 2, the engine control unit will supply power to the solenoid actuator 232 to cause the lever arm to rotate away from the latch pin 134 to allow the plunger arm spring 136 to move the plunger 120 to its second position.

The bracket frame 222 is fixedly connected with a fastener sleeve 270 by an interference fit or other appropriate connection means. The fastener sleeve 270 acts as a torque limiter for threaded fasteners (not shown) which connect the cam cover 200 with the head 2. The fastener sleeve helps to stabilize the position of the gasket after assembly.

Encapsulated within the generally soft material 210 of the gasket is a wiring harness 280. The wiring harness 280 provides a plurality of power wires for supplying voltage to the solenoid actuators 232 and 230. The wiring harness 280 is electrically joined with connector pins 282 so that no electrical connector is required within the inner perimeter of the gasket 207.

To connect the solenoids with the engine head, the gasket is placed on top of the head and the cam cover is placed over the gasket. Threaded fasteners are inserted through the torque limiters and an electrical connector is then connected with the pins 282 and assembly is now complete.

The present invention has been shown in a preferred embodiment but it will be apparent to those skilled in the art of the various changes and modifications which can be made without departing from the spirit or scope of the present invention as it is defined in the accompanying claims.

What is claimed is:

1. A cam cover gasket comprising:
   a generally compliant first material having an upper surface for contact with a cover and a lower surface for contact with an engine head;
   a generally rigid bracket frame of a second material connected with said first material; and
   a plurality of solenoid actuators positioned by and connected with said second material to control a plurality of rocker arms.

2. A gasket as described in claim 1, wherein said first material is a polymeric material and said second material is a metal.

3. A gasket as described in claim 1, wherein said first material includes a first polymeric material and a second polymeric material.

4. A gasket as described in claim 3, wherein said second polymeric material is an elastomeric material.

5. A gasket as described in claim 1, wherein said gasket encapsulates wiring utilized to power said solenoid actuator.

6. A gasket as described in claim 5, wherein said gasket has an external terminal for connection with an electrical connector.

7. A gasket as described in claim 1, wherein said bracket frame further includes a bracket supports connected with said frame for supporting said solenoid actuators.

8. A cam cover gasket comprising:
   a generally compliant first material having an upper surface for contact with a cover and a lower surface for contact with an engine head;
   a generally rigid bracket of a second material connected with said first material;
   a fastener sleeve penetrating said first and second materials and being connected with said second material; and
   a solenoid actuator connected with said second material having a lever arm for pivotally activating a rocker arm between first and second modes of operation.

9. An engine, comprising:
   a plurality of combustion chambers;
   a head with a plurality of passageways fluidly connected with said chambers;
   a plurality of valves controlling fluid communication between said chambers and said passageways;
   a plurality of rocker arms for activating said valves, said rocker arms having first and second modes of operation of said valves;
   a cover enclosing said rocker arms having a surface for mating with said head;
   a gasket captured between said cover mating surface and said head; and
   a plurality of solenoid actuators for activating said plurality of rocker arms between said first and second modes of operation being positioned by and connected with said gasket.

10. An engine as described in claim 9, wherein said gasket includes a generally rigid bracket frame for supporting said solenoids.

11. An engine as described in claim 10, wherein said gasket is fabricated from a generally soft material and a generally rigid material providing said bracket frame.

12. An engine as described in claim 11, wherein said soft material is a polymeric material and said rigid material is a metal.

13. An engine as described in claim 12, wherein said soft material includes a first polymeric material and a second polymeric material.

14. An engine as described in claim 13, wherein said second polymeric material is an elastomeric material.

15. An engine as described in claim 9, wherein said gasket encapsulates wiring utilized to power said solenoids.

16. An engine as described in claim 15, wherein said gasket has an external terminal for connection with an electrical connector.

17. An engine as described in claim 10, wherein said bracket frame further includes bracket supports connected with said frame for supporting said solenoids.

18. An engine as described in claim 11, wherein said gasket soft material has a generally C-shape cross-section and said bracket frame has an end captured within said C-shape cross-section.

19. An engine as described in claim 9, further including a cam shaft for rotating a cam to activate said rocker arms, said cam shaft being rotatively connected on said head.

20. An engine as described in claim 10, wherein said generally rigid bracket frame is connected to a fastener sleeve.

21. An engine as described in claim 20, wherein said bracket frame is connected to said fastener sleeve by an interference fit.

22. An internal combustion engine comprising:
   a plurality of combustion chambers;
   a head with a plurality of respective passageways fluidly connected with said combustion chambers;
   a plurality of valves controlling fluid communication between said respective passageways and said chambers;
   a plurality of respective rocker arms for activating said valves, said rocker arms having first and second modes of operation of said valves;
   a cover enclosing said rocker arms having a surface for mating with said head;
   a gasket captured between said cover mating surface and said head, said gasket being fabricated from a generally soft material and a generally rigid material providing a bracket frame and said gasket encapsulating power supply wiring; and
   a plurality of solenoid actuators for activating respective rocker arms between said first and second modes of operation being positioned by and connected with said gasket rigid bracket frames and being powered by said wiring encapsulated within said gasket.

23. An engine as described in claim 22, wherein said gasket includes fastener sleeves which are fixedly connected with said generally rigid bracket frame.

24. A method of assembling a portion of an internal combustion engine comprising:
   providing a head with a passageway fluidly connected with a combustion chambers and valves controlling fluid communication between said chambers and said passageway;
   providing rocker arms for activating said valves, said rocker arms having first and second modes of operation of said valves;
   placing a gasket on said head, said gasket having a mating surface for said head and a generally opposite mating surface for a cam cover, said gasket being fabricated from a generally soft material and also having a generally rigid material providing a bracket frame, said bracket frame being positioned by and connected with solenoid actuators for activating said rocker arms between said first and second modes of operation; and
   enclosing said head with a cam cover.

25. A method as described in claim 24 further including wiring said solenoids by passing a wire enclosed within said gasket between said solenoids and an external portion of said gasket.

26. A cam cover gasket comprising:
   a generally compliant first material having an upper surface for contact with a cover and a lower surface for contact with an engine head;
   a generally rigid bracket frame of a second material connected with said first material;

a fastener sleeve penetrating said first and second materials and being connected with said second material; and a solenoid actuator connected with said second material.

27. A cam cover gasket comprising:

a generally compliant soft first material having an upper surface for contact with a cover and a lower surface for contact with an engine head;

a generally rigid bracket frame of a second material connected with said first material;

a solenoid actuator connected with said second material; and wherein said gasket first material has a generally C-shape cross-section and said bracket frame has an end captured in said C-shape cross-section.

28. An engine, comprising:

a combustion chamber;

a head with a passageway fluidly connected with said chamber;

a valve controlling fluid communication between said chamber and said passageway;

a rocker arm for activating said valve, said rocker arm having first and second modes of operation of said valve;

a cover enclosing said rocker arm having a surface for mating with said head;

a gasket captured between said cover mating surface and said head; and a solenoid actuator for activating said rocker arm between said first and second modes of operation being connected with said gasket, and wherein said gasket is fabricated from a generally soft material and a generally rigid material forming a bracket frame and said soft material has a C-shape cross-section and said bracket frame has an end captured within said C-shape cross-section.

29. An engine, comprising:

a combustion chamber;

a head with a passageway fluidly connected with said chamber;

a valve controlling fluid communication between said chamber and said passageway;

a rocker arm for activating said valve, said rocker arm having first and second modes of operation of said valve;

a cover enclosing said rocker arm having a surface for mating with said head;

a gasket captured between said cover mating surface and said head; and a solenoid actuator for activating said rocker arm between said first and second modes of operation being connected with said gasket, and wherein said gasket includes a generally rigid bracket frame for supporting said solenoid, and said generally rigid bracket is connected to a fastener sleeve by an interference fit.

30. An internal combustion engine comprising:

a plurality of combustion chambers;

a head with a plurality of respective passageways fluidly connected with said combustion chambers;

a plurality of valves controlling fluid communication between said respective passageways and said chambers;

a plurality of respective rocker arms for activating said valves, said rocker arms having first and second modes of operation of said valves;

a cover enclosing said rocker arms having a surface for mating with said head;

a gasket captured between said cover mating surface and said head, said gasket being fabricated from a generally soft material and a generally rigid material providing a bracket frame and said gasket encapsulating power supply wiring;

a plurality of solenoid actuators for activating respective rocker arms between said first and second modes of operation being connected with said gasket rigid bracket frames and being powered by said wiring encapsulated within said gasket; and wherein said gasket includes fastener sleeves which are fixedly connected with said generally rigid bracket frame.

* * * * *